United States Patent [19]

Farmer

[11] Patent Number: 5,315,529
[45] Date of Patent: May 24, 1994

[54] FLUID VESSEL LEAK EXISTENCE SYSTEM, METHOD AND APPARATUS

[76] Inventor: Edward J. Farmer, 1611 20th St., Sacramento, Calif. 95814

[21] Appl. No.: 774,805

[22] Filed: Oct. 11, 1991

[51] Int. Cl.⁵ ............................................. G01F 23/22
[52] U.S. Cl. .................... 364/509; 340/604; 340/605; 73/31.05; 73/49.2
[58] Field of Search ............... 364/509; 348/603, 604, 348/605; 73/49.2 R, 49.2 T, 31.05; 324/557

[56] References Cited

U.S. PATENT DOCUMENTS

| | | | |
|---|---|---|---|
| 4,166,244 | 8/1979 | Woods et al. | 340/605 |
| 4,357,113 | 11/1982 | Brooks | 340/605 |
| 4,644,354 | 2/1987 | Kidd | 340/605 |
| 4,670,847 | 6/1987 | Furuse | 364/507 |
| 4,796,466 | 1/1989 | Farmer | 73/40.5 R |
| 4,818,976 | 4/1989 | Schmitt et al. | 340/605 |
| 4,823,116 | 4/1989 | Kitchen, III et al. | 340/603 |
| 4,835,522 | 5/1989 | Andrejasich et al. | 340/521 |
| 4,882,499 | 11/1989 | Luukkala et al. | 250/577 |
| 5,003,813 | 4/1991 | Hayes | 73/49.2 |
| 5,079,944 | 1/1992 | Boenning et al. | 73/23.4 |

*Primary Examiner*—Jack B. Harvey
*Assistant Examiner*—Hal D. Wachsman
*Attorney, Agent, or Firm*—Bernhard Kreten

[57] ABSTRACT

A method, system and apparatus for monitoring an environment for the occurrence of an unexpected event, such as monitoring a containment vessel's surroundings for the presence of the contained substance outside of the vessel due to a leak. The method detects the probability that a leak has occurred as opposed to mere natural fluctuations in substance concentration in the surrounding environment. A sensor near the vessel measures substance concentration. The concentrations sensed are transformed into a signal representing substance concentration outside the vessel as a function of time. A statistical analyzer then monitors the signal for specific patterns which indicate that a leak has occurred. Various algorithms are utilizable to determine the probability that a leak has occurred.

26 Claims, 2 Drawing Sheets

FLUID VESSEL LEAK EXISTENCE SYSTEM, METHOD AND APPARATUS

FIELD OF THE INVENTION

The present invention relates to the methods by which the occurrence of a physical event can be determined when the observation of the event is obscured by perturbations in the measurements that are not the result of the event of interest. Specifically, the present invention relates to the systems, methods and means whereby the existence of a leak in a fluid storage tank or other containment device including piping may be promptly, reliably and sensitively determined.

CROSS REFERENCE TO RELATED APPLICATIONS

This application represents further efforts of the inventor in leak analysis such as described in Ser. No. 07/684,168 filed Apr. 1, 1991 and entitled A Method For Locating Leaks In A Fluid Pipeline And Apparatus Therefore.

BACKGROUND OF THE INVENTION

It is important to determine the occurrence of leaks and other similar events because they result in the loss of valuable products stored in the tanks or conveyed in the pipes. Additionally, many of the fluids stored in the tanks or transported in pipes are hazardous to life and property, may be flammable, and may be toxic. They may be incompatible with living matter in a variety of ways. The loss of valuable product as well as the damage to the environment, life and property generally increases with the quantity of fluid that escapes between the inception of the leak and the time it is contained. Consequently early detection of leaks is important. The results are smaller losses of product and hence less difficult and less expensive cleanup and remediation.

Various methods have been developed to detect the occurrence of such leaks. These methods may be categorized as internal and external methods. The methodology that is the subject of the present invention is categorized as an external method.

Internal methods rely on measurements made on the fluid in the tank itself. They necessarily interfere with the fluid within the tank. External methods monitor the tank's environment for leak associated occurrences.

External methods have advantages over internal methods. They avoid invasion of the storage environment, allow leak detection without interfering with flow of fluid into and out of the vessel, and they more easily continuously monitor the vessel for leakage, particularly when dealing with existing tank installations.

One common method of external storage vessel leak detection is to utilize a double walled tank with sensors between the two walls. This method is often inadequate due to the substantial expense involved, particularly when dealing with existing tank installations.

Another common method of external storage vessel leak detection disclosed in U.S. Pat. No. 4,835,522, involves using monitoring equipment in subsurface wells around the tank (vadose monitoring) and in some cases atmospheric monitors located around the tank. Monitoring equipment generally consists of sensors that react to the fluid in the tank and some means of measuring the output signal from these sensors. When the sensors detect the presence of the fluid stored in the tank they respond and the monitoring equipment produces a leakage alarm signal.

This methodology works quite well when there is no precontamination. In such a situation the sensor reads near zero in the absence of a leak, and readings rapidly rise to large values when the leak occurs. However, when a leak has previously occurred, some of the leaked fluid generally remains in the tank and sensor environment even after most of the lost product has been reclaimed. How much remains depends on the fluid that leaked, the specific cleanup and remediation methods employed, and the nature of the contaminating material.

When the sensors are already detecting some of the lingering substance, present leak detection methods are inadequate. Changes in temperature and ground water levels can significantly alter sensor readings signalling a leak when one does not exist.

The method and apparatus of this invention more effectively filter out natural fluctuations of the monitored substance concentration and still respond to leaks when they occur.

The following prior art reflects the state of the art of which applicant is aware and are included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
|---|---|---|
| Farmer | 4,796,466 | January 10, 1989 |
| Furuse | 4,670,847 | June 2, 1987 |

The system of the Farmer patent utilizes statistical methods to distinguish a signal representing a pipeline leak from signals representing normal pipeline functions and other noise.

The Furuse patent discloses an internal leak detection method involving comparing pressure data on a tested tank with tested data on any identical tank known to be leak free. Furuse uses an error correction algorithm to improve the reliability of the pressure readings.

The invention of this application is distinguishable from Furuse in many ways. External readings of contained fluid concentration are made rather than internal pressure readings. Also, this invention is operatable without any requirement of a leak free tank as a control for the test.

The method of this application is distinguishable in that sensors are located external to the vessel being monitored and also this method analyzes concentration data rather than pressure or velocity data as analyzed in the Farmer patent. Usually a containment vessel such as a storage tank has no velocity or pressure to be analyzed and the Farmer patent would not be applicable.

SUMMARY OF THE INVENTION

A method, system and apparatus are described for leakage sensors in both uncontaminated and precontaminated conditions. The system begins with at least one sensor located near a tank or group of tanks to be monitored for leaks. Multiple sensors may be used either when greater sensitivity is desired, when the size of the tank requires multiple sensors for rapid leak detection or when the likely direction of the migratory plume of the substance to be monitored is not certain. Each sensor is strategically located with respect to the tank so that migrating leaking fluid will likely contact the sensor. The sensor is selected so that it is capable of determining the concentration of the substance contained within the tank as a percentage of all of the matter detected by the sensor. Thus, the sensed substance would represent a percentage of the matter surrounding the sensor in a form such as parts per million.

The sensor is connected to a signal conditioner through sensor wiring. The sensor wiring provides power to the sensor and also delivers sensed information to the signal conditioner. The sensor wiring may be isolated from the substance contained within the tank to avoid electric current within the wiring causing ignition of possibly flammable substances.

The signal conditioner receives as input the raw data from the sensor. The signal conditioner then produces a signal which represents concentration of the substance being sensed as a function of time.

The signal from the signal conditioner is then sent to a statistical filter. The statistical filter analyzes the signal to determine whether the signal shows that a leak has occurred. The statistical filter can determine the probability that a leak has occurred as opposed to actually detecting that a leak has occurred. Various algorithms may be utilized by the statistical filter to detect leaks more accurately under different conditions.

A principle algorithm utilized by the statistical filter involves initially computing a first moving average of readings taken by the sensor and then computing a second moving average of a lesser number of readings taken from the sensor. A standard deviation for readings taken by the sensor is also computed. Using statistical methods known in the art, the first moving average, second moving average and standard deviation are combined to determine the probability that a leak has occurred due to the difference between the first moving average and the second moving average.

The probability determined by the statistical filter is then sent to a monitor. The monitor may be in the form of an alarm signalling to operators that a leak has occurred, or the monitor may activate certain containment procedures, or the monitor may display to an operator the probability that a leak has occurred, as well as other outputs.

Under some conditions additional qualifying logic may be interposed between the statistical filter and the monitor. This additional qualifying logic may be programmed to improve the accuracy of the leak detector by causing the monitor to ignore signals representing leak detection when certain conditions exist making a false leak detection likely.

OBJECTS OF THE INVENTION

Accordingly, it is a primary object of the present invention to provide a method for leak detection which is accurate and reliable.

Another object of the present invention is to provide a method for leak detection which avoids giving false alarms that a leak has occurred when it has not.

Another further object of the present invention is to provide a leak detection method which is capable of speedy detection of a leak.

Another further object of the present invention is to provide an apparatus for leak detection which is easy to install and operate.

Another further object of the present invention is to provide an apparatus for leak detection which is easily modified to conform to specific needs of the sensed environment.

Another further object of the present invention is to provide a leak detection method and apparatus which is capable of distinguishing a leak from natural phenomena which mimic leak-like characteristics.

Viewed from a first vantage point it is an object of the present invention to provide a means for detecting a change in proportionate presence of a characteristic of a substance comprising a plurality of sensors capable of detecting and making readings of the presence of said characteristic as a proportion of all matter present, a signal conditioner operatively coupled to said sensors by communication means having means for compiling said readings taken by said sensors and establishing signals for each said sensor representing changes in proportionate presence of said characteristic as a function of time, a processor taking as input said signal and means for statistically filtering out anomalous said readings to determine the probability of the changes in said signals represent occurrence of an event outside normal parameters for said signals, and outputting the result of analysis by said statistical filter means.

Viewed from a second vantage point it is an object of the present invention to provide a method for detecting changes in the proportionate presence of a substance in an environment representing occurrence of an event outside of expected conditions including the steps of: defining a plurality of monitoring locations in an area to be monitored, placing at each monitoring location a sensor capable of detecting the presence of the substance in proportion to all fluid present, monitoring at the monitoring locations thus defined for both the presence and prevalence of characteristics of the substance before occurrence of a triggering event, monitoring at the monitoring locations after occurrence of the triggering event, identifying differences in the prevalence of the substance before and after the occurrence of the triggering event, processing readings taken during both of said monitoring steps to determine if differences discovered in said identification step represent normal fluctuations in substance prevalence or occurrence of the triggering event, and outputting the result of said processing step.

DESCRIPTION OF PREFERRED EMBODIMENTS

Figure 1:
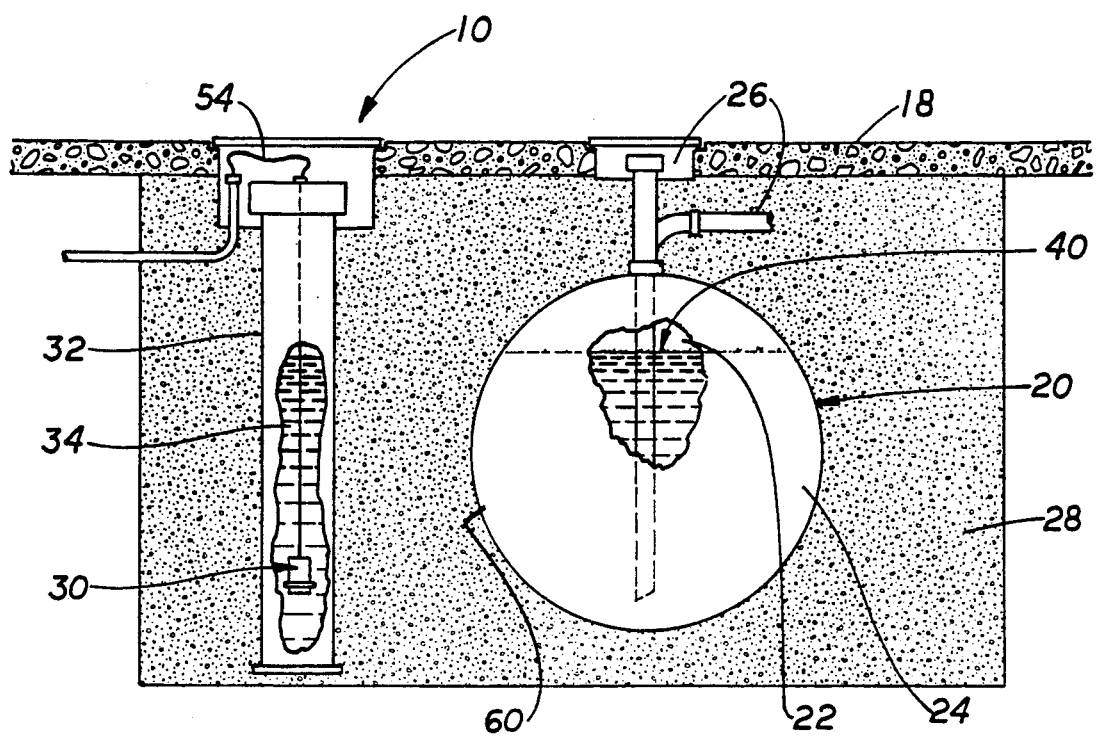
FIG. 1 is an elevational view of a cylindrical tank with the apparatus of this invention operatively located in proximity therewith.

Referring now to the drawing figures wherein like numerals represent like parts throughout, numeral 10 represents a leak detection means.

Figure 3:
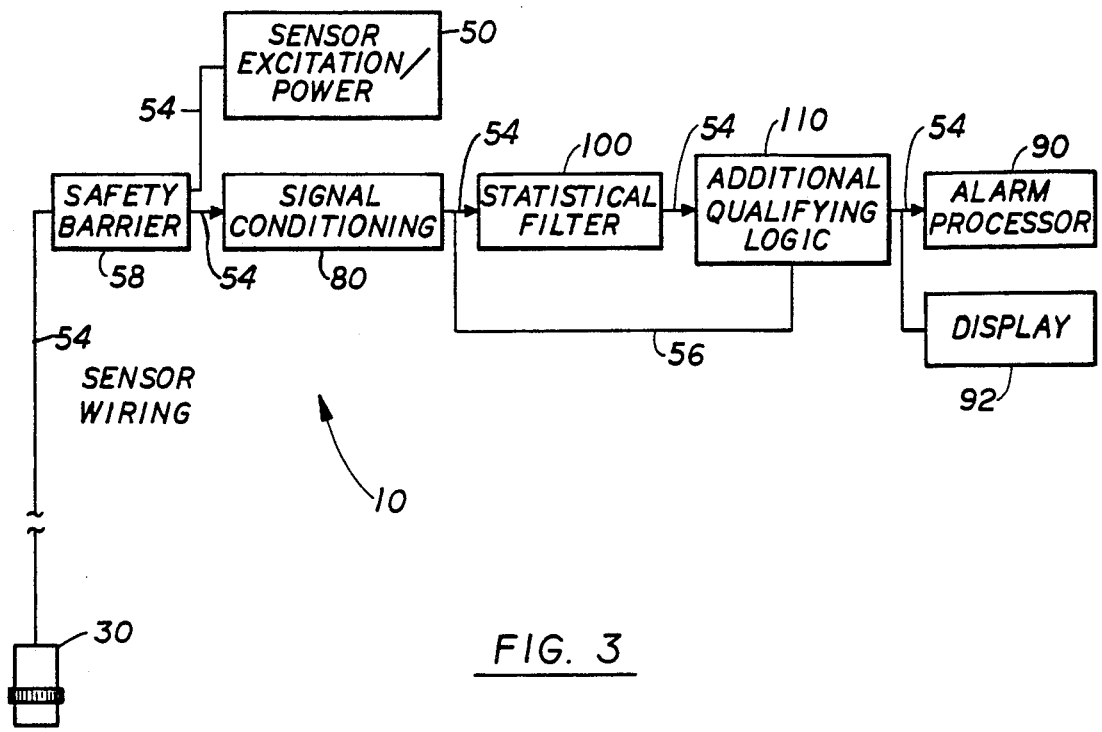
FIG. 3 is a block diagram representing components in the method and apparatus of this invention.

In essence, the leak detection means 10, as shown in FIGS. 1 and 3, includes the following basic components. A sensor 30 is located in an environment proximate to a storage vessel, such as tank 20 to be monitored for leaks 60. The sensor 30 is connected through wiring 54 to a sensor power source 50 and a signal conditioner 80. The signal conditioner 80 in turn is connected to a statistical filter 100 which may exist in the form of software on a digital computer. Finally, an alarm 90 may be connected to the statistical filter 100 to signal that a leak 60 has occurred when so indicated by the statistical filter 100.

More specifically, the sensor 30 can be located within a vadose well 32. The vadose well 32 isolates the sensor 30 from surrounding fill 28 which separates the tank 20, which is under the surface 18, from the sensor 30. Slots 34 in the vadose well 32 allow fluids migrating through the surrounding fill 28 to pass into the vadose well 32 for detection by the sensor 30.

The tank 20 has an exterior 24 and interior 22 containing the monitored substance 40, in the preferred embodiment, and has piping 26 allowing ingress and egress from the tank 20. Leaks 60 in the tank exterior 24 or in the piping 26 are detectable by the leak detection means 10.

In an alternative embodiment, a plurality of sensors 30 may be arranged in an array. In general, the greater number of sensors 30 utilized increases the speed with which leaks 60 may be detected and also increases confidence that a leak 60 will not be missed by the sensors 30.

The sensor 30 is connected through the wiring 54 to the sensor power source 50. The sensor power source 50 provides power to the sensor 30 allowing the sensor 30 to perform its sensing function. The wiring 54 also provides a transmission line through which the sensor 30 may transmit readings 120 (e.g. FIG. 4) taken of the region surrounding the sensor 30. The reading 120 made by the sensor 30, in a preferred embodiment, is of a concentration 44 (e.g. FIG. 2) of a substance 40 located within the tank 20. A common scale for measuring the concentration 44 is parts per million (ppm). The monitored substance 40 may be any substance within the tank 20, in the preferred embodiment.

A safety barrier 58 (FIG. 3) prevents excessive current within the wiring 54 from possibly igniting the substance 40 which is to be monitored. The safety barrier 58 is especially desirable when the monitored substance 40 is highly combustible.

Figure 2:
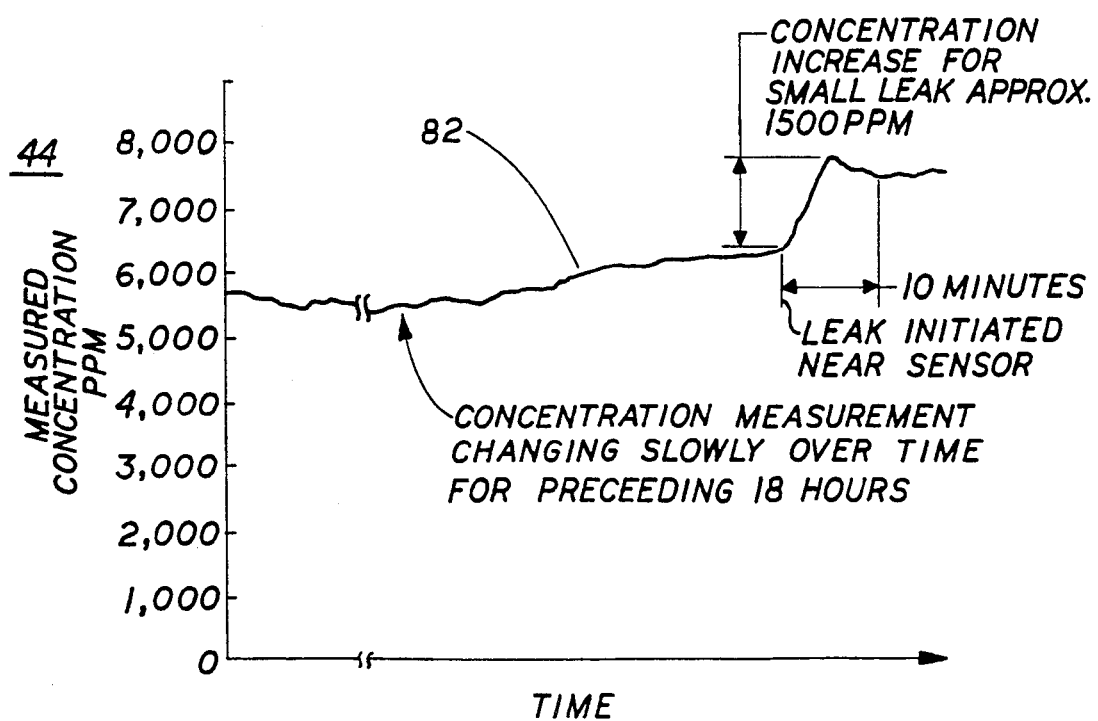
FIG. 2 is a graph representing a typical signal recorded by sensors of the apparatus of this invention.
Figure 4:
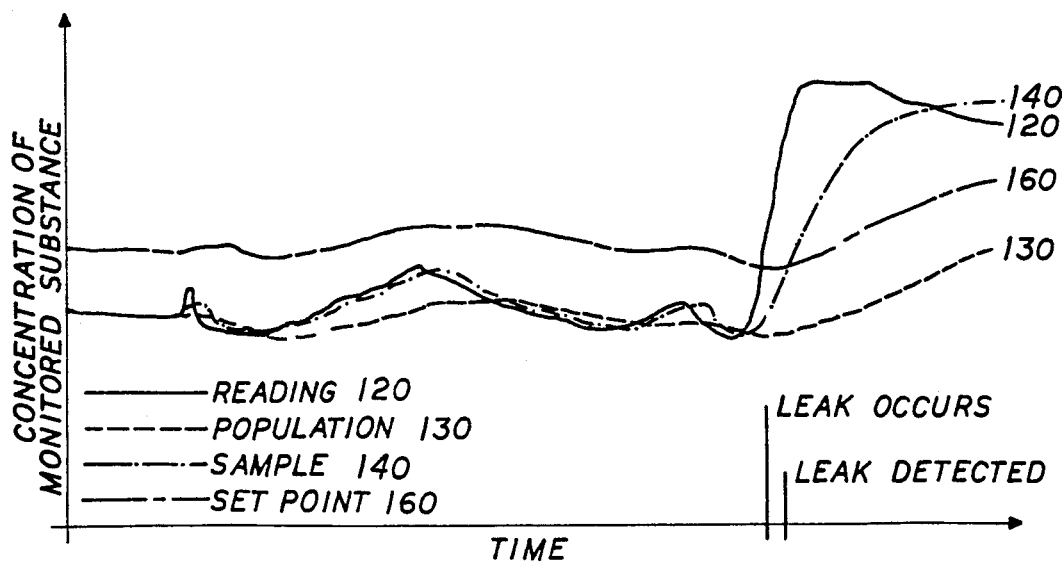
FIG. 4 is a graph representing functions generated by the statistical filter superimposed upon a typical sensor signal.

The sensor 30 sends the readings 120 to the signal conditioner 80. The signal conditioner 80 receives the readings 120 and produces a signal 82 (e.g. FIG. 2) which represents the readings 120 of the sensor 30 as a function of time. Both FIGS. 2 and 4 show sample signals 82 which represent concentration 44 of the monitored substance 40 as a function of time. The signal 82 from the signal conditioner 80 is in a form utilizable by various signal analyzing instrumentation which are commercially available.

The signal 82 is transmitted to the statistical filter 100. The statistical filter 100 may be located a distance away from the sensor 30 and tank 20. The statistical filter 100 may coordinate multiple sensors 30 from a sensor array. Thus, a complex monitoring system may monitor multiple sites and coordinate sensor 30 results at a central location.

Utilizing a variety of different methods, the statistical filter 100 can determine either the probability that a leak 60 has occurred or, with preset excessive concentration 44 amounts programmed therein, may detect whether or not a leak 60 has occurred. Regardless of the method of leak 60 detection used, the statistical filter 100 can output to an alarm 90 capable of signalling an operator that a leak 60 has been detected.

Interposed between the statistical filter 100 and the alarm 90 may be provided additional qualifying logic 110. The additional qualifying logic 110 may take characteristics of the signal 82, before analysis by the statistical filter 100, similar to natural occurrences not representing a leak 60 and disable the statistical filter 100 when the statistical filter 100 would be likely to misinterpret the signal 82 and detect a leak 60 when no leak 60 exists in actuality. The additional qualifying logic 110 receives as input the signal 82 before the statistical filter 100 receives it, through feed-forward wiring 56. For instance, the additional qualifying logic 110 could disable the statistical filter 100 when underground water levels change in a manner creating a likelihood that the sensor 30 will detect a greater concentration 44 of the monitored substance 40 than is actually in existence in the surrounding fill 28 around the tank 20.

The preferred embodiment includes the following method of statistical filter 100 leak 60 detection. First, the signal 82 is processed to calculate a first moving average of a preselected group of readings 120 comprising the signal 82. This first moving average will be referred to as the population 130, graphically depicted in FIG. 4. The population 130 begins with any readings 120 from the sensor 30 selected by the operator and ends with the most recent reading 120 from the sensor 30. Thus, with each new reading 120, a new population 130 is calculated.

Second, a second moving average is calculated from a preselected group of readings 120 of the sensor 30. The second moving average is referred to as the sample 140. The sample 140 begins with readings 120 from the sensor 30 at any subsequent reading after the initial first reading 120 making up the population 130. The sample 140 ends with the most recent reading 120 from the sensor 30. Thus, with each new reading 120 a new sample 140 is calculated and the sample 140 is composed of fewer readings 120 than the population 130.

Third, a standard deviation $\sigma$ of either the population 130 or of all of the readings 120 making up the population 130 is computed. Computation of the standard deviation $\sigma$ can be done in accordance with known statistical procedure.

Fourth, utilizing the population 130, sample 140 and standard deviation $\sigma$ the probability that a leak 60 has been detected may be computed using the following formula:

$$Z = \frac{\overline{\mu} - \overline{y}}{\frac{\sigma}{\sqrt{N_2}} \cdot \sqrt{\frac{N_1 - N_2}{N_1 - 1}}}$$

Where
$\overline{\mu}$ is the first moving average of the population 130,
$\overline{y}$ is the second moving average making up the sample 140,
$\sigma$ is the standard deviation of the signal 82,
$N_1$ is the number of readings 120 making up the population 130,
$N_2$ is the number of readings 120 making up the sample 140, and
$Z$ is the confidence that $\overline{\mu}$ and $\overline{y}$ are different.

Using statistical procedures common in the art, the confidence $Z$ that the population 130 and sample 140 are different can be converted into a probability that the sample 140 is different from the population 130.

If the sample 140 is determined to be different from the population 130, this indicates that the more recent readings 120 composing the sample 140 are substantially different from previous readings 120 making up the population 130. If the sample 140 shows an increase in concentration 44 of the monitored substance 40 over the population 130, this difference signifies that a leak 60 may have occurred. By selecting the size of the population 130 and the size of the sample 140 carefully, the accuracy of the leak 60 detection method of the statistical filter 100 may be significantly enhanced.

Another way to characterize the algorithm of the statistical filter 100 is through analogy to set theory. The readings 120 of the sensor 30 make up individual components of a super set(s) of all readings 120 taken. A first subset is established ($S_1$) comprised of a group of successive readings 120. $S_1$ starts with a preselected reading 120 and ends with the latest reading 120 taken. With each new reading 120 taken $S_1$ is modified adding the new reading 120 and dropping the oldest reading 120. Thus, $S_1$ includes different readings 120 with the sensing of each new reading 120. $S_1$ is referred to as the population 130. $S_1$ is represented by an average of all readings 120 which are a subset of $S_1$. This average of readings in the population 130 is referenced by $\bar{\mu}$. The number of readings in $S_1$ is constant and referenced by $N_1$.

A second subset ($S_2$) is established also comprised of a group of successive readings. $S_2$ is modified identically to the way $S_1$ is modified. $S_2$ is refered to as the sample 140. $S_2$ is represented by an average of all readings which are a subset of $S_2$. This average of readings in the sample 140 is referenced by $\bar{y}$. The number of readings in $S_2$ is constant and referenced by $N_2$. $N_1$ remains larger than $N_2$.

The formula for calculating the confidence (Z) is utilizable with known statistical procedures to determine the probability that $\bar{\mu}$ and $\bar{y}$ are different. When this probability is high it denotes rapid changes in the readings 120 due to a leak 60 as opposed to natural phenomena which may mimic a leak 60.

In an alternative embodiment, after the first and second steps of the method utilized by the statistical filter 100 above, the following method of leak 60 detection may be utilized. A set-point 160 may be established at a fixed amount above the population 130. This set-point 160 will float as the population 130 goes up and down as the population 130 is updated to reflect new readings 120 from the sensor 30. The statistical filter 100 can register that a leak 60 has occurred whenever the sample 140 exceeds the set-point 160 floating above the population 130. If the population 130 goes up gradually, as is common with natural non-leak phenomena, the set-point 160 will climb gradually and the sample 140 will climb gradually thus preventing the sample 140 from exceeding the set-point 160. When a leak 60 occurs, the sample 140 increases rapidly and faster than the population 130 and hence the sample 140 will exceed the set-point 160 and indicate that a leak 60 has occurred. Care must be taken in setting the set-point 160 at a concentration enough above the population 130 to avoid false leak 60 indications but not so high as to cause actual leaks 60 to be obscured.

In another alternative embodiment, the statistical filter 100 may monitor the signal 82 to determine rates of change of the signal 82 itself or of any moving average of the signal 82. If the rate of change of the signal 82 or the moving average exceeds a set rate of change, then a leak is indicated to the alarm 90.

In use and operation, the leak detection device 10 may be utilized in the following way. Sensors 30 may be oriented around a tank 20 to be monitored. The sensors 30 then begin taking readings 120 and sending the readings 120 to a signal conditioner 80. The signal conditioner 80 then creates a signal 82 representing concentration 44 of the monitored substance 40 as a function of time. A statistical filter 100 then analyzes the signal 82 to determine if fluctuations in the signal 82 represent a leak 60 or merely other non-leak phenomena. If a leak 60 is detected by the statistical filter 100 then an alarm 90 is activated signalling an operator that a leak 60 has occurred. In place of the alarm 90 a display 92 may display to an operator the probability that a leak 60 has occurred. The operator may then decide whether the probability that a leak 60 has occurred is high enough to merit further investigation.

When a leak occurs the monitored substance 40 migrates through the fill 28 surrounding the tank 20. This migration is indicated by an increase in concentration 44 of the monitored substance 40 in the matter surrounding the tank 20. When this increased concentration 44 reaches the sensor 30, the signal 82 generated by the signal conditioner 80 is altered. The statistical filter 100 then detects the probability that the leak 60 has occurred through the above-described method, and signals an alarm 90 or notice to an operator through a monitor 92.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. Means for detecting a change in the presence of a substance in a mixture having other matter present by measuring a proportionate presence of a characteristic of the substance with respect to the other matter present within a sensed environment, comprising in combination:

a plurality of sensors detecting and making concentration readings of the proportionate presence of said characteristic as a proportion of the other matter present, the concentration readings defining a concentration of the substance within the matter present, a signal conditioner operatively coupled to said sensors by communication means having means for compiling said concentration readings taken by said sensors in chronological sequence according to a time corresponding to when each said concentration reading was taken, relative to other said concentration readings, to establish a signal representing magnitudes of changes in the concentration of the substance as a function of time, a processor taking as input said signal and means for statistically filtering out anomalous said concentration readings, such that the processor will determine the probability that changes in said signal represent occurrence of an event relating to conditions in the sensed environment rather than an anomaly due to normal fluctuations in said concentration readings by ignoring any single said concentration reading alone, and means for outputting the result of analysis by said statistical filter means;

whereby said event can be accurately distinguished from said anomaly.

2. The detecting means of claim 1 wherein said processor is a statistical filter establishing a first moving average of said concentration readings and a second moving average of said concentration readings comprised of fewer said concentration readings than said first moving average, and wherein said statistical filter determines the probability of an event based on changes to the second moving average with respect to the first moving average.

3. The detecting means of claim 2 wherein said statistical filter also computes the standard deviation of certain of said concentration readings, and wherein the statistical filter then utilizes the standard deviation, first moving average, and second moving average to determine the probability that said second moving average is indicative of said event, due to said concentration readings being outside of usual parameters for said signal.

4. The detecting means of claim 3 wherein said sensors surround, on an outer side thereof, a containment vessel containing said substance being sensed;

wherein said sensors measure concentration of said substance;

wherein said event is a leak of said substance from an interior of said containment vessel; and wherein said statistical filter computes said standard deviation by utilizing concentration readings comprising said first moving average;

whereby leaks in said containment vessel may be distinguished from anomalous said concentration readings by said sensors not representing a leak in said containment vessel.

5. The detecting means of claim 1 wherein said processor includes a statistical filter establishing a first moving average of said concentration readings and a second moving average of said concentration readings comprised of fewer concentration readings than said first moving average, and wherein said statistical filter determines if an event has occurred by establishing an event set-point which floats a constant amount above said first moving average and registers an event's occurrence whenever said second moving average exceeds said event set-point, said event set-point remaining a constant amount above said first moving average while said first moving average adjusts to include additional said concentration readings.

6. The detecting means of claim 5 wherein said sensors surround, on an outer side thereof, a containment vessel containing said substance being sensed;

wherein said sensors measure concentration of said substance;

wherein said event is a leak of said substance from an interior of said containment vessel; and wherein said statistical filter computes said event set-point by adding concentration readings comprising said first moving average, dividing by the number of concentration readings added and then adding a constant value selected by a user;

whereby leaks in said containment vessel may be distinguished from anomalous said readings by said sensors not representing a leak in said containment vessel.

7. The detecting means of claim 1 wherein said processor employs numerical methods to determine the rate of change of said concentration readings comprising said signal and establishes an event rate of change set point such that an event is detected whenever the rate of change of said concentration readings exceeds said event rate of change set-point.

8. The detecting means of claim 7 wherein said sensors surround, on an outer side thereof, a containment vessel containing said substance being sensed; and wherein said event is a leak of said substance from an interior of said containment vessel;

whereby leaks in said containment vessel may be distinguished from anomalous said readings by said sensors not representing a leak in said containment vessel.

9. The detecting means of claim 1 wherein said processor employs a statistical filter to determine a moving average of said concentration readings and notes an event when said moving average has a rate of change in excess of an event rate of change set-point which is established at a constant predetermined value; and wherein said rate of change is calculated by said processor by finding a difference between a most recent value of said moving average and a previous value of said moving average and dividing by a time interval between said most recent value and said previous value.

10. The detecting means of claim 5 wherein said sensors surround, on an outer side thereof, a containment vessel containing said substance being sensed;

wherein said sensors measure concentration of said substance as a ratio of all matter present; and wherein said event is a leak of said substance from an interior of said containment vessel;

whereby leaks in said containment vessel may be distinguished from anomalous said readings by said sensors not representing a leak in said containment vessel.

11. A method for detecting changes in the proportionate presence of a substance in an environment representing occurrence of an event outside of expected conditions, including the steps of:

defining a plurality of monitoring locations in an area to be monitored, placing at each monitoring location a sensor detecting the presence of the substance in proportion to all fluid present, monitoring at the monitoring locations thus defined for both the presence and prevalence of the substance before occurrence of a triggering event, monitoring at the monitoring locations after occurrence of the triggering event, establishing a signal from readings taken during both of said monitoring steps by orienting the readings in chronological sequence, the signal representing changes in the readings over time representing changes in magnitude of the substance.

identifying differences in the prevalence of the substance represented by the signal before and after the occurrence of the triggering event, processing the signal statistically to determine if differences discovered in said identifying step represent normal fluctuations in substance prevalence or actual occurrence of the triggering event, and outputting the result of said processing step.

12. The method of claim 11 wherein said processing step includes analyzing readings from the signal for a first predetermined quantity of the most recent readings by comparison with the statistical properties of a second predetermined quantity of readings, said second quantity of measurements being made during a second period of time, wherein
said second period of time is different from the time period of the most recent measurement period; and
said first predetermined quantity of the most recent readings includes fewer readings than said second predetermined quantity of readings, and
wherein said processing step includes analyzing statistical properties of the two sets of readings and identifying differences in the statistical properties indicative of the triggering event.

13. The method of claim 11 wherein said processing step includes steps of:
calculating a first moving average of the signal from said establishing step representing a preselected number of the most recent readings,
calculating a second moving average of the signal representing a lesser preselected number of the most recent readings, and
determining whether differences between the first moving average and the second moving average of readings represent the triggering event or normal fluctuations in substance prevalence.

14. The method of claim 13 including monitoring the environment proximate to yet outside of a containment vessel confining the substance being monitored, and
detecting the triggering event which is the leakage of the substance out of the containment vessel and into the surrounding environment.

15. The method of claim 14 wherein said determining step includes steps of:
establishing a set-point a constant amount above the first moving average of said readings,
monitoring the second moving average to determine if it is above or below the set-point, and
signalling the occurrence of a leak if the second moving average is above the set-point.

16. The method of claim 14 wherein said determining step includes steps of:
calculating the standard deviation of said readings,
calculating the statistical probability a leak has occurred by utilizing the first moving average, second moving average and standard deviation of the readings, and
outputting a probability a leak has occurred.

17. The method of claim 16 including the further steps of monitoring the environment for a more recent reading, repeating said calculating the statistical probability step with new values of the first moving average, second moving average and standard deviation including the more recent reading, and
signalling occurrence of a leak if the probability determined in said calculating step exceeds a preset probability.

18. The method of claim 11 wherein said processing step includes steps of:
calculating a moving average of the readings recorded during both of said monitoring steps,
calculating the rate of change of the moving average with respect to time and
signalling the occurrence of an unexpected event if the rate of change of the moving average exceeds a predetermined amount.

19. The method of claim 18 including monitoring the environment proximate to yet outside of a containment vessel confining the substance being monitored, and
detecting the triggering event which is the leakage of the substance out of the containment vessel and into the surrounding environment.

20. A system for secure confinement of a substance having substance leak detecting capabilities comprised of:
a tank with inlet and outlet means capable of initial confinement of the substance,
a plurality of sensors located outside said tank detecting the proportionate presence of the substance as a proportion of fluid present,
a signal generating means taking output from said sensors and establishing a signal representing the proportionate presence of the substance adjacent said sensors at multiple different times,
a processing means analyzing said signal and statistically filtering out non-indicative portions of said signal and analyzing said signal statistically to determine if said signal represents a leak of the substance from said tank, and
communication means whereby said sensors can communicate said output to said signal generating means and to said processing means and results of said processing means are communicated to a final output device.

21. The confinement system of claim 20 wherein said processing means characterizes statistically said signal and calculates a probability that changes detected in said signal over time indicate occurrence of a leak in said tank.

22. The confinement system of claim 21 wherein said signal is comprised of successive readings which are grouped into a large population and also grouped into a smaller sample and wherein a leak is indicated when an average sample value exceeds an average population value by an amount not less than a preset constant amount.

23. A method of detecting leaks in storage tanks and piping, the steps including:
defining one or more fluid concentration monitoring locations around the storage tank or tanks,
monitoring, at one or more of said locations thus defined, for one or more physical characteristics of the fluid stored in the tank prior to the occurrence of a leak to establish baseline values of these physical characteristics,
continuing to monitor the physical characteristics of matter surrounding the storage tank or tanks until after the occurrence of a leak so that differences between the monitored physical characteristics before and after the occurrence of a leak are identified,
compiling readings from each monitoring location into a signal representing magnitudes of fluid concentration at various times before and after the occurrence of the leak, and
processing data representing differences in the monitored physical characteristics that occur to detect the leak using an algorithm that tolerates normal changes in each reading individually in the absence of a leak but responds quickly to changes in the readings resulting from a leak.

24. The method of claim 23 wherein said monitoring step measures concentration of stored fluid in matter surrounding the storage tank or tanks and wherein said processing step utilizes a statistical analyzer for analyzing data from the monitoring step for a first predetermined quantity of a set of most recent readings, by comparing their statistical properties with the statistical properties of a second predetermined quantity of a set of most recent readings of greater quantity than said first predetermined quantity of the set of most recent readings, whereby differences between said first predetermined quantity of the set of most recent readings and said second predetermined quantity of the set of most recent readings correspond to the probability that a leak has occurred.

25. The method of claim 24 wherein said processing step includes the step of comparing measured concentration values of an average of the first predetermined quantity of the most recent readings against an alarm set-point floating a fixed amount higher than an average of measured concentration values of the second predetermined quantity of the most recent readings, the second quantity being greater than the first quantity.

26. The method of claim 23 wherein said processing step measures rate of change of moving average of readings and alarms on rates of change greater than a set amount and does not alarm on rates of changes less than the set amount.

* * * * *